United States Patent
McVay et al.

(10) Patent No.: US 11,897,236 B2
(45) Date of Patent: *Feb. 13, 2024

(54) COATING COMPOSITIONS COMPRISING A SILANE MODIFIED COMPOUND

(71) Applicant: PPG Industries Ohio, Inc., Cleveland, OH (US)

(72) Inventors: Robert McVay, Cincinnati, OH (US); Christopher L. Most, Edgewood, KY (US); Samantha Ewen, Liberty Township, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 124 days.

This patent is subject to a terminal disclaimer.

(21) Appl. No.: 17/547,325

(22) Filed: Dec. 10, 2021

(65) Prior Publication Data

US 2022/0098433 A1 Mar. 31, 2022

Related U.S. Application Data

(63) Continuation of application No. 16/781,537, filed on Feb. 4, 2020, now Pat. No. 11,214,703, which is a continuation of application No. 15/848,226, filed on Dec. 20, 2017, now Pat. No. 10,597,552.

(51) Int. Cl.

| | |
|---|---|
| *B32B 27/34* | (2006.01) |
| *C09D 133/10* | (2006.01) |
| *B05D 1/02* | (2006.01) |
| *B65D 25/14* | (2006.01) |
| *B05D 7/14* | (2006.01) |
| *B05D 3/02* | (2006.01) |
| *B05D 7/22* | (2006.01) |
| *C09D 161/06* | (2006.01) |
| *C09D 183/06* | (2006.01) |
| *C08G 77/26* | (2006.01) |
| *C09D 161/14* | (2006.01) |
| *C09D 183/00* | (2006.01) |
| *B32B 27/28* | (2006.01) |
| *B32B 27/06* | (2006.01) |
| *B32B 27/38* | (2006.01) |
| *B32B 27/30* | (2006.01) |

(52) U.S. Cl.
CPC ............ *B32B 27/34* (2013.01); *B05D 1/02* (2013.01); *B05D 3/0272* (2013.01); *B05D 7/14* (2013.01); *B05D 7/227* (2013.01); *B32B 27/06* (2013.01); *B32B 27/283* (2013.01); *B32B 27/308* (2013.01); *B32B 27/38* (2013.01); *B65D 25/14* (2013.01); *C08G 77/26* (2013.01); *C09D 133/10* (2013.01); *C09D 161/06* (2013.01); *C09D 161/14* (2013.01); *C09D 183/00* (2013.01); *C09D 183/06* (2013.01); *Y10T 428/13* (2015.01); *Y10T 428/1352* (2015.01); *Y10T 428/1355* (2015.01); *Y10T 428/1379* (2015.01)

(58) Field of Classification Search
CPC ....... B32B 27/34; B32B 27/06; B32B 27/283; B32B 27/308; B32B 27/38; B05D 1/02; B05D 3/0272; B05D 7/14; B05D 7/227; B65D 25/14; C08G 77/26; C09D 133/10; C09D 161/06; C09D 161/14; C09D 183/00; C09D 183/06; C08L 33/10; C08L 83/06; C08L 83/08; Y10T 428/13; Y10T 428/1352; Y10T 428/1355; Y10T 428/1379; C08K 5/0025

See application file for complete search history.

(56) References Cited

U.S. PATENT DOCUMENTS

| | | |
|---|---|---|
| 4,963,602 A | 10/1990 | Patel |
| 9,670,376 B1 | 6/2017 | Dawley |
| 2016/0264811 A1 | 9/2016 | McVay et al. |
| 2021/0102085 A1* | 4/2021 | Wojtalewicz ............ C08K 5/20 |

FOREIGN PATENT DOCUMENTS

| | | |
|---|---|---|
| EP | 1333075 A1 | 8/2003 |
| JP | 2002040663 A | 2/2002 |
| SU | 1698237 A1 | 12/1991 |

\* cited by examiner

*Primary Examiner* — James C Yager

(57) ABSTRACT

A coating composition comprising an acid functional acrylic resin and a silane modified compound is disclosed. Substrates coated at least in part with such coatings are also disclosed.

22 Claims, No Drawings

COATING COMPOSITIONS COMPRISING A SILANE MODIFIED COMPOUND

FIELD OF THE INVENTION

The present invention is directed to a coating composition comprising an acid functional acrylic resin and a silane modified compound. Substrates, including packages, coated at least in part with such a coating are also within the scope of the present invention.

BACKGROUND OF THE INVENTION

The application of various polymeric coatings to metallic substrates, including metal cans such as food, beverage and cosmetic containers, to retard or inhibit corrosion is well established. Coatings are applied to the interior of such containers to prevent the contents from contacting the metal of the container. Contact between the metal and the food, beverage or cosmetic can lead to corrosion of the metal container, which can then contaminate the product. This is particularly true when the contents of the container are acidic in nature, such as tomato-based products and soft drinks.

Certain coatings, particularly in the packaging industry, must undergo extreme stresses in the course of preparation and use of the packaging containers. In addition to flexibility, packaging coatings may also need resistance to chemicals, solvents, and pasteurization processes used in the packaging of beer and other beverages, and may also need to withstand retort conditions commonly employed in food packaging. In addition to corrosion protection, coatings for food and beverage containers should be non-toxic, and should not adversely affect the taste of the food or beverage in the can. Resistance to "popping", "blushing" and/or "blistering" may also be desired.

Bisphenol A ("BPA") contributes to many of the properties desired in packaging coating products. The use of BPA and related products such as bisphenol A diglycidyl ether ("BADGE"), however, has recently come under scrutiny in the packaging industry. Substantially BPA-free coatings having properties comparable to coatings comprising BPA are therefore desired. A reduced use of formaldehyde in coatings is also desired.

SUMMARY OF THE INVENTION

The present invention is directed to a coating composition comprising an acid functional acrylic resin and a silane modified compound. Substrates coated at least in part with such coatings are also within the scope of the present invention.

DETAILED DESCRIPTION OF THE INVENTION

The present invention is directed to a coating composition comprising an acid functional acrylic resin and a silane modified compound. Functionality on the silane modified compound and the carboxylic acid functionality on the acrylic resin react during cure to form a crosslinked coating. For example, if the silane modified compound comprises an aminosilane modified compound, an amide is formed upon reaction with the carboxylic acid functionality.

The acrylic resin may be formed by using any number of acrylic monomers, including styrene, alkyl (meth)acrylates such as ethyl (meth)acrylate, methyl (meth)acrylate, and butyl (meth)acrylate, functional acrylates such as hydroxyethyl (meth)acrylate, and acrylamides such as n-butoxy methyl acrylamide. For example, an acid functional (meth) acrylic acid and an alkyl (meth)acrylate may each be used. Mixtures of (meth)acrylic resins can also be used. The acrylic resin used in the coating compositions should have unreacted carboxylic acid functionality. According to the present invention, the acrylic resin may exclude or be substantially free of styrene, ethyl acrylate, acrylamide and/or vinyl chloride monomers as these monomers may not be desired in certain formulations, such as those used on packaging; in this context "substantially free" means these monomers are not intentionally used in the polymerization of the acrylic and are therefore present, if at all, in an amount of 1 wt % or less, based on total wt % of the monomers. In addition, when using an acrylic resin in the present compositions, the (meth)acrylic resin may be substantially free of unreacted unsaturation. That is, reaction of the (meth)acrylic monomers in the formation of the (meth)acrylic resin will consume the unsaturation. Thus, the (meth)acrylic resins used according to the present invention are not radiation curable, and any residual unsaturation that might remain in the (meth)acrylic resin upon reaction of the monomers is not enough to render the (meth)acrylic resin radiation curable.

A "silane modified compound" refers to a compound that is the reaction product of a silane that has functionality in addition to the silane hydrogen and a compound that will react with this functionality, sometimes referred to herein as the "modifying compound". A particularly suitable silane is an aminosilane, in which the alkoxy, such as ethoxy and/or methoxy, functionality reacts with functionality on the modifying compound. Any aminosilane can be used, such as those commercially available from ShinEtsu as KBE-903, KBM-903, KBM-603 and KBM-602. Another suitable silane is epoxy silane, in which the epoxy group reacts with the modifying compound. Epoxy silanes are commercially available from ShinEtsu as KBM-403 and KBM-303. Vinyl silanes and acryloxy silanes can also be used, and are available from ShinEtsu as KBM-1003 and KBE-1003, and KBM-5103 and KBM-503, respectively. Mixtures of silane modified compounds can be used; a mixture of aminosilane and epoxy silane may be suitable. When the silane comprises aminosilane, the silane modified compound may be referred to herein as an aminosilane modified compound, and when the silane comprises epoxy silane as an epoxy silane modified compound.

Any suitable modifying compound(s) can be used, and can be selected based on the silane(s) being used and/or the performance characteristics that may be achieved from using particular modifying agents. The modifying compound that will react with the functionality of the silane may be, for example, a silanol containing compound such as a silicone comprising at least one silanol group. A "silicone" will be understood as generally referring to a compound having Si—O bonds. A "silicone comprising at least one silanol group" refers to a silicone having one or more Si—OH bonds. Silicones comprising at least one silanol group are commercially available from SilTech. The weight average molecular weight ("Mw") of the silicone comprising at least one silanol group can be 10,000 or greater, such as 15,000 or greater or 20,000 or greater or 40,000 or lower, 35,000 or lower or 30,000 or lower. Any Mw range within these endpoints can be used; a particularly suitable Mw range is 17,000 to 23,000. Mw as reported herein is measured by GPC using a polystyrene standard. Particularly suitable silicones are silanol functional silsesquioxanes commercially available from Dow Chemical in their RSN line. RSN 217, for example, is a fully phenylated silanol functional silsesquioxane and with a degree of substitution of 1.0. RSN 233, for example, is a silanol functional silsesquioxane with a phenyl to methyl ratio of 1.3:1 and a degree of substitution of 1.15. RSN 255, for example, is also a silanol functional silsesquioxane with a phenyl to methyl ratio of 0.84:1 and a degree of substitution of 1.05. All of these values are as reported by the manufacturer, Dow. Other suitable silanols include linear or branched silanol terminated polysiloxane resins comprising terminal silanol groups, pendant silanol groups or those resins comprising both dimethyl and diphenyl groups that also contain silanol functionality.

The modifying compound that will react with the functionality of the silane may be, for example, a hydroxyl containing compound. A particularly suitable hydroxyl containing compound is a phenolic novolak. A phenolic novolak will be understood as referring to an acid catalyzed phenolic made with an excess of phenolic monomer to formaldehyde. Suitable phenolic novolak products are commercially available from Durez, as 29008, and Allnex, as PN650. Use of a phenolic novolak in the silane modified compound allows for the advantages of using a phenolic in a coating composition, which is of particular interest for metal cans because phenolic polymers contribute to corrosion resistance in a wide variety of foods. In addition, because phenolic novolak is made with an excess of phenolic monomers versus formaldehyde all of the formaldehyde is consumed during the polymerization of the novolak. Therefore, novolak phenolics do not generate formaldehyde as a byproduct during cure. The present coating compositions can therefore be formulated so as to be substantially free, essentially free or completely free of formaldehyde.

The silane modified compound can be prepared prior to adding the compound to the present coating composition, or can be prepared in-situ during the coating composition preparation. That is, the silane can be added during formulation of the coating and will react with the modifying compound in-situ. The silane modified compound can also be made separately. The phenolic novolak and/or silicone comprising at least one silanol group, for example, can be heated in a flask to which is added the silane. The amount of silane to modifying compound that will react with the silane can vary, such as 15 wt % or greater, 20 wt % or greater or 25 wt % or greater, and 40 wt % or less, such as 30 wt % or less, or 20 to 25 wt % silane, and 85 wt % or less, 80 wt % or less or 75 wt % or less and 60 wt % or greater such as 70 wt % or greater or 75 to 80 wt % modifying compound, with wt % based on total solid weight.

The acid functional acrylic resin and silane modified compound can be blended together to form the coating compositions of present invention by any means known in the art. For example, the components may be blended together using agitation or using a Cowles blade. The amount of acid functional acrylic resin in the present coating compositions may be 15 wt % or greater, such as 20 wt % or greater or 30 wt % or greater, or 35 wt % or lower, such as 30 wt % or lower or 25 wt % or lower; a suitable amount may range, for example, from 15 to 35 wt %. The amount of silane modified compound in the present coating compositions may be 45 wt % or greater, such as 50 wt % or greater or 55 wt % or greater, or 65 wt % or lower, such as 60 wt % or lower or 55 wt % or lower, where wt % is based on total solids weight of the composition. A wt % of 45 to 65 may be particularly suitable.

The coating compositions of the present invention may contain one or more of several additional compounds. A particularly suitable compound, particularly when the silane comprises aminosilane, is epoxidated vegetable oil ("EVO"). Any suitable EVO can be used, and can either be obtained commercially or prepared by epoxidizing a vegetable oil. Vegetable oils include but are not limited to corn, cottonseed, linseed, rapeseed, tall, palm, peanut, sesame, sunflower, and soy. Epoxidized soy bean oil ("ESBO") is particularly suitable and is commercially available from a number of sources, such as Hallstar, as PLASTHALL ESO, and Arkema, in its VIKOFLEX line, such as VIKOFLEX 7170. ESBO and other epoxidized vegetable oils are known as plasticizers in materials using vinyl chlorides. It was surprisingly discovered that a coating composition comprising EVO with an acid functional acrylic resin and an aminosilane modified compound imparts greater corrosion resistance to a metal substrate when such composition is cured as compared to a cured composition lacking the EVO. It will be appreciated that the epoxy in the EVO may react with amine functionality on the aminosilane modified compound. If used, the EVO can be added separately upon formulation of the coating composition or can be reacted with the silane modified compound before that compound is added to the composition. The amount of EVO in the present compositions, if used, can vary, such as 5 wt % or greater, 7.5 wt % or greater, 10 wt % or greater or 12 wt % or greater, and such as 20 wt % or lower or 15 wt % or lower, with wt % based on the total solids weight of the composition. A wt % of 10-12 may be particularly suitable.

Other epoxidized compounds may be used according to the present invention, such as epoxidized polybutadiene.

Another suitable component that can be used in the present compositions is an amine terminated polyamide. Any amine terminated polyamide can be used according to the present invention. The polyamide, for example, can be based on a dimer acid. Suitable amine values for the polyamide can vary based on the needs of the user and can range, for example from 220 to 250, such as 232 to 242, as determined by titration with HBr in HBr/Acetic acid using methyl violet indicator. The viscosity of the polyamide can also vary, and can range, for example, from 400 to 800 poise, such as 550 to 700 poise, when measured with a #3 spindle at 20 RPM by Brookfield viscometer at 40° C. Polyamides are widely commercially available, such as from Hexion in their EPIKURE line. The amount of amine terminated polyamide in the present compositions, if used, can vary, such as 2 wt % or greater, 3.5 wt % or greater, or 5 wt % or greater, and such as 15 wt % or lower, 12.5 wt % or lower, or 10 wt % or lower, with wt % based on the total solids weight of the composition. A wt % of 3 to 12 may be particularly suitable.

Another suitable component that can be used in the present compositions is shellac. Shellac is secreted by the female lac bug, and is therefore a renewable resource. Shellac is commercially available from Renshel in India, such as in solid form as RENSHEL 101. The shellac may be present in the composition in any desired amount, such as 5 wt % or greater, 10 wt % or greater, 15 wt % or greater, 20 wt % or greater or 25 wt % or greater, and such as 35 wt % or lower, 30 wt % or lower, 25 wt % or lower, 20 wt % or lower, or 15 wt % or lower, with wt % based on total solids of the coating composition. A wt % of 10 to 20 may be particularly suitable. Any of the ranges within these parameters can be used.

Coating compositions of the present invention may also contain silicone in addition to any silicone that may be used in the formation of the silane modified compound. Any suitable silicone can be used, including those described above. Other suitable silicones include amino-modified silicone resins containing methyl or phenyl or a combination of methyl and phenyl; alkoxy modified silicone resins containing methyl or phenyl or a combination of methyl and phenyl; epoxy modified silicone resins containing methyl or phenyl or a combination of methyl and phenyl. If used, such silicones may be present in an amount of 1 wt % or greater, such as wt % or greater or 5 wt % or greater, or 20 wt % or lower, such as 10 wt % or lower or 7 wt % or lower with wt % based on total solids of the coating composition; a wt % of 1 to may be particularly suitable.

The coating compositions of the present invention may comprise one or more solvents including water or organic solvents. Suitable organic solvents include glycols, glycol ether alcohols, alcohols, ketones, and aromatics, such as xylene and toluene, acetates, mineral spirits, naphthas and/or mixtures thereof. "Acetates" include the glycol ether acetates. The solvent can be a non-aqueous solvent. "Non-aqueous solvent" and like terms means that less than 50% of the solvent is water. For example, less than 10%, or even less than 5% or 2%, of the solvent can be water. It will be understood that mixtures of solvents, including or excluding water in an amount of less than 50%, can constitute a "non-aqueous solvent". The composition may be aqueous or water-based. This means that 50% or more of the solvent is water. These embodiments have less than 50%, such as less than 20%, less than 10%, less than 5% or less than 2% solvent.

The coating composition may be in solid particulate form, i.e. a powder coating. Such coatings will be appreciated as being environmentally friendly, as only water is released on cure.

If desired, the compositions can comprise other optional materials well known in the art of formulating, such as colorants, plasticizers, abrasion resistant particles, anti-oxidants, hindered amine light stabilizers, UV light absorbers and stabilizers, surfactants, flow control agents, thixotropic agents, fillers, organic cosolvents, reactive diluents, catalysts, grind vehicles, slip agents, moisture scavenger and other customary auxiliaries.

As used herein, the term "colorant" means any substance that imparts color and/or other opacity and/or other visual effect, e.g. gloss, to the composition. The colorant can be added to the coating in any suitable form, such as discrete particles, dispersions, solutions and/or flakes. A single colorant or a mixture of two or more colorants can be used in the coatings of the present invention. Particularly suitable for packaging coatings are those approved for food contact, such as titanium dioxide; iron oxides, such as black iron oxide; carbon black; ultramarine blue; phthalocyanines, such as phthalocyanine blue and phthalocyanine green; graphite fibrils; ferried yellow; quindo red; and combinations thereof, and those listed in Article 178.3297 of the Code of Federal Regulations, which is incorporated by reference herein.

Example colorants include matting pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, carbon fiber, graphite, other conductive pigments and/or fillers and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water-miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemicals, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are described, for example, in U.S. Pat. No. 7,605,194 at column 3, line 56 to column 16, line 25, the cited portion of which being incorporated herein by reference.

The photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with the present invention have minimal migration out of the coating. Example photosensitive compositions and/or photochromic compositions and methods for making them are identified in U.S. Pat. No. 8,153,344, and incorporated herein by reference.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

An "abrasion resistant particle" is one that, when used in a coating, will impart some level of abrasion resistance to the coating as compared with the same coating lacking the particles. Suitable abrasion resistant particles include organic and/or inorganic particles. Examples of suitable organic particles include but are not limited to diamond particles, such as diamond dust particles, and particles formed from carbide materials; examples of carbide particles include but are not limited to titanium carbide, silicon carbide and boron carbide. Examples of suitable inorganic particles, include but are not limited to silica; alumina; alumina silicate; silica alumina; alkali aluminosilicate; borosilicate glass; nitrides including boron nitride and silicon nitride; oxides including titanium dioxide and zinc oxide; quartz; nepheline syenite; zircon such as in the form of zirconium oxide; buddeluyite; and eudialyte. Particles of any size can be used, as can mixtures of different particles and/or different sized particles. For example, the particles can be microparticles, having an average particle size of 0.1 to 50, 0.1 to 20, 1 to 12, 1 to 10, or 3 to 6 microns, or any combination within any of these ranges. The particles can be nanoparticles, having an average particle size of less than 0.1 micron, such as 0.8 to 500, 10 to 100, or 100 to 500 nanometers, or any combination within these ranges.

Any slip agent can be used according to the present invention such as those commercially available from BYK Chemie or Dow Corning. A wax can also be used such as polyolefin wax or paraffin.

The coating compositions of the present invention and/or the components thereof may be substantially free, may be essentially free and/or may be completely free of bisphenol A ("BPA") and compounds derived from bisphenol A, such as bisphenol A diglycidyl ether ("BADGE"). Such compounds are sometimes referred to as "BPA non intent" because BPA, including derivatives or residues thereof, are not intentionally added but may be present in trace amounts because of impurities or unavoidable contamination from the environment. The coating compositions and/or components thereof can also be substantially free and may be essentially free and/or may be completely free of bisphenol F ("BPF") and compounds derived from bisphenol F, such as bisphenol F diglycidyl ether ("BFDGE"). The term "substantially free" as used in this context means the coating composition contains less than 1000 parts per million (ppm), "essentially free" means less than 100 ppm and "completely free" means less than 20 parts per billion (ppb) of any of the above mentioned compounds, derivatives or residues thereof.

In addition, the compositions of the present invention and/or components thereof may be substantially free, may be essentially free and/or may be completely free of formaldehyde and/or phenolic cross-linker, such as phenolic resin. The term "substantially free" as used in this context means the compositions contain, and/or release on cure, less than 1000 parts per million (ppm), "essentially free" means less than 100 ppm and "completely free" means less than 100 parts per billion (ppb) of formaldehyde compounds, phenolic cross-linker, derivatives or residues thereof.

The present compositions can be applied to any substrates known in the art, for example, automotive substrates, marine substrates, industrial substrates, packaging substrates, wood flooring and furniture, apparel, electronics including housings and circuit boards and including consumer electronics such as housings for computers, notebooks, smartphones, tablets, televisions, gaming equipment, computer equipment, computer accessories, MP3 players, and the like, glass and transparencies, sports equipment including golf balls, and the like. Accordingly, the present invention is further directed to a substrate coated at least in part with any of the coating compositions described above. These substrates can be, for example, metallic or non-metallic. Metallic substrates include tin, steel, tin-plated steel, chromium passivated steel, galvanized steel, aluminum, aluminum foil. Metal sheet as used herein refers to flat metal sheet and coiled metal sheet, which is coiled, uncoiled for coating and then re-coiled for shipment to a manufacturer. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) ("PET"), polycarbonate, polycarbonate acrylobutadiene styrene ("PC/ABS"), polyamide, wood, veneer, wood composite, particle board, medium density fiberboard, cement, stone, glass, paper, cardboard, textiles, leather both synthetic and natural, and the like. The substrate can be one that has been already treated in some manner, such as to impart visual and/or color effect. Suitable substrates can include those in which powder coatings are typically applied.

The compositions of the present invention can be applied by any means standard in the art, such as electrocoating, spraying, electrostatic spraying, dipping, rolling, brushing, and the like.

The compositions can be applied to a dry film thickness of 0.04 mils to 4 mils, such as 0.3 to 2 or 0.7 to 1.3 mils. The compositions can also be applied to a dry film thickness of 0.1 mils or greater, 0.5 mils or greater 1.0 mils or greater, 2.0 mils or greater, 5.0 mils or greater, or even thicker. In some applications, a dry film thickness of 1-20 microns, such as 2-6 microns, is desired.

The compositions of the present invention can be used alone, or in combination with one or more other compositions, such as a coating system having two or more layers. For example, the compositions of the present invention can comprise a colorant or not and can be used as a primer, basecoat, and/or top coat. For substrates coated with multiple coatings, one or more of those coatings can be coatings as described herein. The present coatings can also be used as a packaging "size" coating, wash coat, spray coat, end coat, and the like.

It will be appreciated that the compositions described herein can be either one component ("1K"), or multi-component compositions such as two component ("2K") or more. A 1K composition will be understood as referring to a composition wherein all the coating components are maintained in the same container after manufacture, during storage, etc. A 1K composition can be applied to a substrate and cured by any conventional means, such as by heating, forced air, and the like. The present compositions can also be multi-component, which will be understood as compositions in which various components are maintained separately until just prior to application. The present compositions can be thermoplastic or thermosetting.

The composition can be a clearcoat. A clearcoat will be understood as a coating that is substantially transparent or translucent. A clearcoat can therefore have some degree of color, provided it does not make the clearcoat opaque or otherwise affect, to any significant degree, the ability to see the underlying substrate. The clearcoats of the present invention can be used, for example, in conjunction with a pigmented basecoat. The clearcoat can be formulated as is known in the coatings art.

The composition may also comprise a colorant, such as a pigmented basecoat used in conjunction with a clearcoat, or as a pigmented monocoat. Such coating layers are used in various industries to impart a decorative and/or protective finish. For example, such a coating or coating system may be applied to a vehicle. "Vehicle" is used herein in its broadest sense and includes all types of vehicles, such as but not limited to cars, trucks, buses, vans, golf carts, motorcycles, bicycles, railroad cars, airplanes, helicopters, boats of any size and the like. It will be appreciated that the portion of the vehicle that is coated according to the present invention may vary depending on why the coating is being used. For example, anti-chip primers may be applied to some of the portions of the vehicle as described above. When used as a colored basecoat or monocoat, the present coatings will typically be applied to those portions of the vehicle that are visible such as the roof, hood, doors trunk lid and the like, but may also be applied to other areas such as inside the trunk, inside the door and the like especially when the compositions are formulated as sealants or adhesives; they can also be applied to those portions of the car that are in contact with the driver and/or passengers, such as the steering wheel, dashboard, gear shift, controls, door handle and the like. Clearcoats will typically be applied to the exterior of a vehicle.

The compositions of the present invention are also suitable for use as packaging coatings. The application of various pretreatments and coatings to packaging is well established. Such treatments and/or coatings, for example, can be used in the case of metal cans, wherein the treatment and/or coating may be used to retard or inhibit corrosion, provide a decorative coating, and/or provide ease of handling during the manufacturing process. Coatings can be applied to the interior of such cans to prevent the contents from contacting the metal of the container. Contact between the metal and a food or beverage, for example, can lead to corrosion of a metal container, which can then contaminate the food or beverage. This is particularly true when the contents of the can are acidic in nature. The coatings applied to the interior of metal cans also help prevent corrosion in the headspace of the cans, which is the area between the fill line of the product and the can lid; corrosion in the headspace is particularly problematic with food products having a high salt content. Coatings can also be applied to the exterior of metal cans. Certain coatings of the present invention are particularly applicable for use with coiled metal stock, such as the coiled metal stock from which the ends of cans are made ("can end stock"), and end caps and closures are made ("cap/closure stock"). Since coatings designed for use on can end stock and cap/closure stock are typically applied prior to the piece being cut and stamped out of the coiled metal stock, they are typically flexible and extensible. For example, such stock is typically coated on both sides. Thereafter, the coated metal stock is punched. For can ends, the metal is then scored for the "pop-top" opening and the pop-top ring is then attached with a pin that is separately fabricated. The end is then attached to the can body by an edge rolling process. A similar procedure is done for "easy open" can ends. For easy open can ends, a score substantially around the perimeter of the lid allows for easy opening or removing of the lid from the can, typically by means of a pull tab. For caps and closures, the cap/closure stock is typically coated, such as by roll coating, and the cap or closure stamped out of the stock; it is possible, however, to coat the cap/closure after formation. Coatings for cans subjected to relatively stringent temperature and/or pressure requirements should also be resistant to popping, corrosion, blushing and/or blistering.

Accordingly, the present invention is further directed to a package coated at least in part with any of the coating compositions described above. A "package" is anything used to contain another item, particularly for shipping from a point of manufacture to a consumer, and for subsequent storage by a consumer. A package will be therefore understood as something that is sealed so as to keep its contents free from deterioration until opened by a consumer. The manufacturer will often identify the length of time during which the food or beverage will be free from spoilage, which typically ranges from several months to years. Thus, the present "package" is distinguished from a storage container or bakeware in which a consumer might make and/or store food; such a container would only maintain the freshness or integrity of the food item for a relatively short period. "Package" as used herein means the complete package itself or any component thereof, such as an end, lid, cap and the like. For example, a "package" coated with any of the coating compositions described herein might include a metal can in which only the can end or a portion thereof is coated. A package according to the present invention can be made of metal or non-metal, for example, plastic or laminate, and be in any form. An example of a suitable package is a laminate tube. Another example of a suitable package is metal can. The term "metal can" includes any type of metal can, container or any type of receptacle or portion thereof that is sealed by the food/beverage manufacturer to minimize or eliminate spoilage of the contents until such package is opened by the consumer. One example of a metal can is a food can; the term "food can(s)" is used herein to refer to cans, containers or any type of receptacle or portion thereof used to hold any type of food and/or beverage. "Beverage can" may also be used to refer more specifically to a food can in which a beverage is packaged. The term "metal can(s)" specifically includes food cans (including beverage cans) and also specifically includes "can ends" including "E-Z open ends", which are typically stamped from can end stock and used in conjunction with the packaging of food and beverages. The term "metal cans" also specifically includes metal caps and/or closures such as bottle caps, screw top caps and lids of any size, lug caps, and the like. The metal cans can be used to hold other items as well, including, but not limited to, personal care products, bug spray, spray paint, and any other compound suitable for packaging in an aerosol can. The cans can include "two piece cans" and "three-piece cans" as well as drawn and ironed one-piece cans; such one piece cans often find application with aerosol products. Packages coated according to the present invention can also include plastic bottles, plastic tubes, laminates and flexible packaging, such as those made from PE, PP, PET and the like. Such packaging could hold, for example, food, toothpaste, personal care products and the like.

The coating can be applied to the interior and/or the exterior of the package. For example, the coating can be rollcoated onto metal used to make a two-piece food can, a three-piece food can, can end stock and/or cap/closure stock. The coating is applied to a coil or sheet by roll coating; the coating is then cured by radiation and can ends are stamped out and fabricated into the finished product, i.e. can ends. The coating could also be applied as a rim coat to the bottom of the can; such application can be by roll coating. The rim coat functions to reduce friction for improved handling during the continued fabrication and/or processing of the can. The coating can be applied to the "side stripe" of a metal can, which will be understood as the seam formed during fabrication of a three-piece can. The coating can also be applied to caps and/or closures; such application can include, for example, a protective varnish that is applied before and/or after formation of the cap/closure and/or a pigmented enamel post applied to the cap, particularly those having a scored seam at the bottom of the cap. Decorated can stock can also be partially coated externally with the coating described herein, and the decorated, coated can stock used to form various metal cans.

Metal coils, having wide application in many industries, are also substrates that can be coated according to the present invention. Coil coatings also typically comprise a colorant.

After application to the substrate, the coating composition may be cured by any appropriate means. In some applications a cure of 425° F. or lower, such as 415 or lower or 400 or lower for 5 minutes or less, such as 4.5 minutes or less may be desired and can be achieved according to the present invention. In other applications, a longer cure time might be appropriate, such as a cure time of ten to twelve minutes at 380° F. to 425° F. Suitable cure conditions can be determined based on the needs of the user. Accordingly, the present coatings can be used across a broad range of industries and cure conditions.

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein. Singular encompasses plural and vice versa. For example, although reference is made herein to "an" acid functional acrylic resin, "a" silane modified compound, "a" modifying compound, "a" phenolic novolak, "a" silicone comprising at least one silanol group, and the like, one or more of each of these and any other components can be used. As used herein, the term "polymer" refers to oligomers and both homopolymers and copolymers, and the prefix "poly" refers to two or more. (Meth) acrylic, and like terms, refers to both acrylic and meth-acrylic. Including, for example, and like terms means including, for example, but not limited to. When ranges are given, any endpoints of those ranges and/or numbers within those ranges can be combined within the scope of the present invention. When maximum and minimum amounts are given, any such amounts can be combined to specify ranges of ingredients; any numbers within those ranges can be combined within the scope of the present invention. The word "comprising" and forms of the word "comprising", as used in this description and in the claims, does not limit the present invention to exclude any variants or additions. Additionally, although the present invention has been described in terms of "comprising", the processes, materials, and coating compositions detailed herein may also be described as "consisting essentially of" or "consisting of".

Non-limiting aspects of the invention include:

1. A coating composition comprising an acid functional acrylic resin and an aminosilane modified compound.
2. The coating composition of aspect 1, wherein the functionality on the silane modified compound and the carboxylic acid functionality on the acrylic resin react to form a crosslinked coating.
3. The coating composition of any preceding aspect, wherein the silane in the silane modified compound comprises aminosilane, epoxy silane or both.
4. The coating composition of any preceding aspect, wherein the silane modified compound comprises the reaction product of a silane and a phenolic novolak.
5. The coating composition of aspect 4, wherein the phenolic novolak comprises a t-butyl novolak or a cresol novolak.
6. The coating composition of any preceding aspect, wherein the silane modified compound comprises the reaction product of a silane and a silicone comprising at least one silanol group.
7. The coating composition of aspect 6, wherein the silicone comprises a silanol functional silsesquioxane.
8. The coating composition of any preceding aspect, wherein the silane comprises aminosilane.
9. The coating composition of any preceding aspect, wherein the composition further comprises EVO, such as ESBO, polybutadiene, polyamine terminated polyamide, silicone and/or shellac.
10. The coating composition of any preceding aspect, wherein the composition comprises an aminosilane modified compound that comprises the reaction product of an aminosilane and a phenolic novolak and an aminosilane modified compound that comprises the reaction product of an aminosilane and a silicone comprising at least one silanol group.
11. The coating composition of any preceding aspect, wherein the composition comprises an aminosilane modified compound that comprises the reaction product of an aminosilane and a first phenolic novolak and an aminosilane modified compound that comprises the reaction product of an aminosilane and a second phenolic novolak.
12. The coating composition of any preceding aspect, wherein the composition and/or components thereof are substantially free, essentially free, or completely free of BPA, BPF and derivatives thereof.
13. The coating composition of any preceding aspect, wherein the composition and/or components thereof are substantially free, essentially free, or completely free of formaldehyde and/or phenolic cross-linker.
14. The coating composition of any preceding aspect, wherein the composition and/or components thereof are substantially free, essentially free, or completely free of styrene, ethyl acrylate and/or acrylamide, such as N-BMA.
15. A substrate coated at least in part with the coating composition any preceding aspect.
16. The substrate of aspect 15, wherein the substrate comprises a package.
17. The package of aspect 16, wherein the package is a metal can.
18. The package of aspect 17, wherein the metal can is a food can or beverage can.
19. The package of aspect 17, wherein the metal can is a food can or a beverage can coated at least in part on the inside with the coating composition of any aspects 1-14.

EXAMPLES

The following examples are intended to illustrate the invention and should not be construed as limiting the invention in any way.

Example 1

| Acrylic A Solids | |
| --- | --- |
| Ethyl methacrylate | 33% |
| Methyl acrylate | 36% |
| Methacrylic acid | 31% |
| | 100% |

| Acrylic A composition in solvent | |
| --- | --- |
| Ethyl methacrylate | 671 |
| Methyl Acrylate | 729 |
| Methacrylic acid | 630 |
| Butanol | 2376 |
| T butyl peroctoate | 99 |

Acrylic A was prepared in a 5 liter round bottom flask by charging butanol, heating to reflux, and adding the monomers over three hours using T butyl peroctoate as a free radical initiator.

| Coating Composition 1 Resin solids | |
| --- | --- |
| 29-008P at 60 wt % solids in pentanol[1] | 70% |
| KBM-603[2] | 5% |
| Acrylic A at 23.5 wt % solids in water at 30% neutralization | 25% |
| | 100% |

[1] t-butyl novolak from Durez
[2] aminosilane from ShinEtsu

| Coating composition 1, final coating | | |
| --- | --- | --- |
| 29-008P solution at 60% solids | 1296 | grams |
| KBM-603 | 56 | grams |
| Acrylic A at 23.5 wt % solids in water | 1182 | grams |
| Oleic Acid | 10 | grams |
| SURFYNOL 104[3] | 15 | grams |
| DI water | 1166 | grams |

[3] wetting aid from Air Products

Coating composition 1 was made by charging the 29-088P solution into a stainless steel tank and then adding the aminosilane under agitation with a paddle blade at 700 RPM. The components were allowed to mix for five minutes, after which Acrylic A solution was added. The components were mixed for 15 minutes after which the oleic acid and the SURFYNOL were added. DI water was used to adjust the viscosity to 21 seconds as measured by a #4 Ford cup and to a solids of about 27 wt %.

Example 2

Aminosilane modified phenolic novolaks were prepared by charging 29-008P solution in pentanol to a three liter flask equipped with a Dean Stark trap and condenser. The novolak solution was heated to 200° F. and the aminosilane was added; methanol was evolved. The mixture was heated at 240° F. until the methanol was removed. The same procedure was used to make the Novolak B graft.

| Novolak A graft | | |
| --- | --- | --- |
| 29-008P at 60 wt % solids in pentanol | 1500 | grams |
| KBM-603 | 240 | grams |
| | 1740 | grams |

| Novolak B graft | | |
| --- | --- | --- |
| PN650 at 55 wt % solids in pentanol[4] | 1500 | grams |
| KBM-603 | 210 | grams |
| | 1710 | grams |

[4] cresole novolak from Allnex

Coating composition 2 was prepared by neutralizing Acrylic A to 30% with dimethylethanolamine, and reducing with DI water to 30 wt % solids. Novolak A was added to the Acrylic A solution with agitation with a Cowles blade at 700 RPM. Then 25% of the DI water was added to reduce the viscosity and the product allowed to mix for 15 minutes. Novolak B was added under agitation at 700 RPM and the product allowed to mix for 15 minutes. EPIKURE was added and mixed for 15 minutes, then the oleic acid and SURFYNOL were added. The remaining water was added to adjust the viscosity to 22 seconds as measured using a #4 Ford cup and to a solids of about 27 wt %.

| Coating Composition 2 Resin solids | |
| --- | --- |
| Novolak A graft solids | 55% |
| Novolak B graft solids | 20% |
| Acrylic A at 30 wt % solids in water at 30% neutralization | 20% |
| EPIKURE 3115[5] at 80 wt % solids in butanol | 5% |
| | 100% |

[5] amine terminated polyamide from Hexion

| Coating composition 2, final coating | |
| --- | --- |
| Novolac A graft solution | 839.60 |
| Novolac B graft solution | 330.0 |
| Acrylic A at 30 wt % solids | 666.67 |
| EPIKURE at 80 wt % solids in butanol | 62.5 |
| Oleic Acid | 20 |
| SURFYNOL 104 | 15 |
| DI water | 1694 |
| | 3627.77 |

Example 3

Acrylic B was prepared as described above for Acrylic A using the following:

| Acrylic B Solids | |
| --- | --- |
| Ethyl methacrylate | 37% |
| Methyl acrylate | 36% |
| Methacrylic acid | 27% |
| | 100% |

| Acrylic B composition in solvent | |
| --- | --- |
| Ethyl methacrylate | 752 |
| Methyl Acrylate | 730 |
| Methacrylic acid | 548 |
| Butanol | 2376 |
| T butyl peroctoate | 99 |

An aminosilane modified silicone was prepared by charging RSN217 solution in pentanol to a three liter flask equipped with a Dean Stark trap and condenser. The silicone solution was heated to 200° F. and the aminosilane was added; methanol was evolved. The mixture was heated at 240° F. until the methanol was removed.

| Silicone A | | |
| --- | --- | --- |
| RSN 217[6] at 60 wt % solids in pentanol | 1500 | grams |
| KBM-603 | 726 | grams |
| | 2226 | grams |

[6]RSN 217 = Silsesquioxane silicone from Dow Chemical

Coating composition 3 was prepared by neutralizing Acrylic A to 30% with dimethylethanolamine, and reducing with DI water to 30 wt % solids. Silicone A was added to the Acrylic A solution with agitation with a Cowles blade at 700 RPM. Then 25% of the DI water was added to reduce the viscosity and the product allowed to mix for 15 minutes. Novolak B was added under agitation at 700 RPM and the product allowed to mix for 15 minutes. EPIKURE was added and mixed for 15 minutes, then the oleic acid and SURFYNOL were added. The remaining water was added to adjust the viscosity to 22 seconds as measured using a #4 Ford cup and to a solids of about 27 wt %.

| Coating Composition 3 Resin solids | |
| --- | --- |
| Silicone A graft solids | 55% |
| Novolak B graft solids | 20% |
| Acrylic A at 30 wt % solids in water at 30% neutralization | 20% |
| EPIKURE 3115 at 80 wt % solids in butanol | 5% |
| | 100% |

| Coating composition 3, final coating | |
| --- | --- |
| Silicone A solution | 753.4 |
| Novolac B solution | 330.0 |
| Acrylic A at 30 wt % solids | 666.67 |
| EPIKURE at 80 wt % solids in butanol | 62.5 |
| Oleic Acid | 20 |
| SURFYNOL 104 | 15 |
| DI water | 1694 |
| | 3541.57 |

Example 4

| Novolak C graft | |
| --- | --- |
| 29-008P at 60 wt % solids in pentanol | 1000 grams |
| KBM-603 | 138 grams |
| ESBO | 456 grams |
| | 1594 |

| Coating composition 4 resin solids | |
| --- | --- |
| Novolak C graft solids | 55% |
| Novolak B graft solids | 20% |
| Acrylic A at 30 wt % solids in water at 30% neutralization | 20% |
| EPIKURE 3115 at 80 wt % solids in butanol | 5% |
| | 100% |

| Coating composition 4, final coating | |
| --- | --- |
| Novolak C graft solids | 734.2 |
| Novolak B graft solids | 330.6 |
| Acrylic A at 30 wt % solids in water at 30% neutralization | 666.67 |
| EPIKURE 3115 at 80 wt % solids in butanol | 62.5 |
| Oleic acid | 20 |
| SURFYNOL | 15 |
| DI water | 1694 |
| | 3527.47 |

Novolak graft C was made by charging the 29008P solution in pentanol to a 3-liter flask equipped with a Dean Stark trap. The novolak solution was heated to 200° F. then the KBM-603 was added. Methanol was evolved. Heating was continued to 240° F. until all the methanol was removed. The ESBO was added once the novolak solution reached 240° F. and was held there for two hours.

Coating Composition 4 was made as generally described above for Coating Composition 3.

Example 5

Coating Composition 5 was made as generally described above, with the shellac added with a Cowles blade at 600 RPM after the Acrylic was reduced to 30 wt % solids.

| Coating Composition 5 Resin solids | |
| --- | --- |
| Novolak A graft solids | 45% |
| Novolak Bgraft solids | 25% |
| Acrylic A at 30 wt % solids in water at 30% neutralization | 20% |
| Shellac at 50 wt % solids in butanol | 10% |
| | 100% |

| Coating composition 5, final coating | |
| --- | --- |
| Novolak A graft solution | 687.00 |
| Novolac B graft solution | 413.00 |
| Acrylic A at 30% solids | 666.67 |
| Shellac at 50% solids in butanol | 200 |
| Oleic Acid | 20 |
| SURFYNOL 104 | 15 |
| DI water | 1694 |
| | 3695.67 |

Example 6

An epoxy silane modified novolak was prepared by charging 29-008P in pentanol to a three liter flask equipped with a Dean Stark trap and condenser. The novolak solution was heated to 200° F. and the epoxy silane was added; methanol was evolved. The mixture was heated at 240° F. until the methanol was removed.

| Novolak D graft | |
| --- | --- |
| 29-008P at 60 wt % solids in pentanol | 1000 grams |
| KBM-403[7] | 132 grams |
| | 1132 grams |

[7]epoxy silane from ShinEtsu

Coating Composition 6 was prepared by neutralizing Acrylic A to 30% with dimethylethanolamine, and reduced with DI water to 30 wt % solids. Novolak A was added to Acrylic A solution with agitation with a Cowles blade at 700 RPM. Then was added 25% of the DI water to reduce the viscosity and the product was allowed to mix for 15 minutes. Novolak D was added under agitation at 700 RPM and the product allowed to mix for 15 minutes. EPIKURE was added and mixed for 15 minutes, then the oleic acid and SURFYNOL were added. The remaining water was added to adjust the viscosity to 22 seconds as measured using a #4 Ford cup and to a solids of about 27 wt %.

| Coating Composition 6 Resin solids | |
| --- | --- |
| Novolak A graft solids | 55% |
| Novolak D graft solids | 20% |
| Acrylic A at 30 wt % solids in water at 30% neutralization | 20% |
| EPIKURE 3115 at 80 wt % solids in butanol | 5% |
| | 100% |

| Coating composition 6, final coating | | |
| --- | --- | --- |
| Acrylic A at 30% solids | 666.7 | grams |
| Novolak A graft solution | 839.7 | grams |
| Novolak D graft solution | 309.3 | grams |
| EPIKURE 3115 at 80% solids in butanol | 62.5 | grams |
| Oleic Acid | 20 | grams |
| SURFYNOL 104 | 15 | grams |
| DI water | 1790.5 | grams |
| | 3703.7 | grams |

Example 7

Coating compositions 1-6 were airless spray applied to a 300×407 can at 300 mgs and baked for five minutes in an inside bake oven at a peak metal temperature of 425° F. on the upper side wall. All of the coatings were found to have over 100 MEK double rubs as measured by placing a cotton cloth over the rounded end of a Ball PEEN Hammer then soaking it with methyl ethyl ketone and rubbing the baked panel with the weight of the hammer and the M.E.K. soaked cloth. All of the coatings passed steam process for one hour at 250° F. with no blush or adhesion loss upon crosshatch and taping. Steam process is a test where the baked cans were placed inside of a steam retort and steam was heated to 250° F. to test the film for blush, a whitening of the film, or adhesion loss after scratching through the film with a razor blade in a crosshatch pattern.

What is claimed is:

1. A coating composition comprising an acid functional acrylic resin and a silane modified compound, wherein the coating composition is substantially free, essentially free, and/or completely free of formaldehyde, wherein the silane modified compound comprises a reaction product of an amino and/or epoxy silane and a silanol containing compound.

2. The coating composition of claim 1, wherein the acid functional acrylic resin is formed from acrylic monomers comprising styrene, alkyl (meth)acrylates, functional (meth) acrylates, and/or acrylamides.

3. The coating composition of claim 2, wherein the acid functional acrylic resin is formed from alkyl (meth)acrylate monomers comprising butyl (meth)acrylate.

4. The coating composition of claim 1, wherein the acid functional acrylic resin comprises at least 15 wt % of the coating composition based on total solids weight of the coating composition.

5. The coating composition of claim 1, wherein the silane modified compound comprises at least 45 wt % of the coating composition based on total solids weight of the coating composition.

6. The coating composition of claim 1, wherein the silanol containing compound comprises a silicone comprising at least one silanol group.

7. The coating composition of claim 6, wherein the silicone comprises a silanol functional silsesquioxane.

8. The coating composition of claim 1, wherein the silanol containing compound comprises a linear or branched silanol terminated polysiloxane resin.

9. The coating composition of claim 1, further comprising an epoxidized vegetable oil and/or an amine terminated polyamide.

10. A substrate at least partially coated with the coating composition of claim 1.

11. The substrate of claim 10, wherein the substrate comprises a package.

12. A coating composition comprising an acid functional acrylic resin and a silane modified compound, wherein the silane modified compound comprises the reaction product of a reaction mixture comprising:
   an aminosilane and/or an epoxy silane; and
   a silicone comprising at least one silanol group,
   wherein the acid functional acrylic resin is formed from acrylic monomers comprising styrene, alkyl (meth) acrylates, functional (meth)acrylates, and/or acrylamides.

13. The coating composition of claim 12, wherein the acid functional acrylic resin is formed from alkyl (meth)acrylate monomers comprising butyl (meth)acrylate.

14. The coating composition of claim 12, wherein the acid functional acrylic resin comprises at least 15 wt. % of the coating composition based on total solids weight of the coating composition.

15. The coating composition of claim 12, wherein the silane modified compound comprises at least 45 wt % of the coating composition based on total solids weight of the coating composition.

16. The coating composition of claim 12, further comprising an epoxidized vegetable oil and/or an amine terminated polyamide.

17. A substrate at least partially coated with the coating composition of claim 12.

18. The substrate of claim 17, wherein the substrate comprises a package.

19. A coating composition comprising an acid functional acrylic resin and a silane modified compound, wherein the coating composition is substantially free, essentially free, and/or completely free of formaldehyde, wherein the silane modified compound comprises a reaction product of an amino and/or epoxy silane and a hydroxyl containing compound.

20. The coating composition of claim 19, wherein the hydroxyl containing compound comprises a phenolic novolak.

21. A substrate at least partially coated with the coating composition of claim 19.

22. The substrate of claim 21, wherein the substrate comprises a package.

* * * * *